United States Patent
Oshimi et al.

(10) Patent No.: US 7,318,963 B2
(45) Date of Patent: Jan. 15, 2008

(54) COMPOSITE CHROMIUM PLATING FILM AND SLIDING MEMBER HAVING THE SAME AND METHOD FOR MANUFACTURE THEREOF

(75) Inventors: Takeo Oshimi, Kashiwazaki (JP); Kiyotaka Oku, Kashiwazaki (JP); Katsumi Takiguchi, Kashiwazaki (JP)

(73) Assignee: Kabushiki Kaisha Riken, Tokyo (JP)

( * ) Notice: Subject to any disclaimer, the term of this patent is extended or adjusted under 35 U.S.C. 154(b) by 182 days.

(21) Appl. No.: 10/531,422

(22) PCT Filed: Jan. 28, 2005

(86) PCT No.: PCT/JP2005/001277

§ 371 (c)(1),
(2), (4) Date: Apr. 15, 2005

(87) PCT Pub. No.: WO2005/073437

PCT Pub. Date: Aug. 11, 2005

(65) Prior Publication Data
US 2006/0040124 A1    Feb. 23, 2006

(30) Foreign Application Priority Data
Jan. 30, 2004    (JP) .............................. 2004-023889

(51) Int. Cl.
*B32B 5/00* (2006.01)
*C25D 3/04* (2006.01)

(52) U.S. Cl. ...................... 428/666; 428/687; 428/935; 205/109; 205/113

(58) Field of Classification Search ..................... None
See application file for complete search history.

(56) References Cited

U.S. PATENT DOCUMENTS

| | | | |
|---|---|---|---|
| 3,713,999 A * | 1/1973 | Law et al. ..................... 205/50 |
| 3,770,286 A * | 11/1973 | Angilella et al. ........... 277/444 |
| 3,795,593 A * | 3/1974 | Brown et al. ................ 205/113 |
| 3,867,267 A * | 2/1975 | Brown et al. ................ 205/113 |
| 3,943,040 A * | 3/1976 | Willson ...................... 205/113 |
| 4,846,940 A | 7/1989 | Neuhäuser et al. |
| 6,013,380 A * | 1/2000 | Harayama et al. .......... 428/627 |
| 6,054,225 A * | 4/2000 | Harayama et al. .......... 428/667 |
| 2002/0060159 A1* | 5/2002 | Shimizu ..................... 205/179 |

FOREIGN PATENT DOCUMENTS

| | | | |
|---|---|---|---|
| EP | 0668375 A1 * | 8/1995 |
| JP | 62-56600 | 3/1987 |
| JP | 10-053881 | 2/1998 |
| JP | 10-103519 * | 4/1998 |
| JP | 10-130891 | 5/1998 |
| JP | 10-130892 | 5/1998 |

* cited by examiner

*Primary Examiner*—John J Zimmerman
(74) *Attorney, Agent, or Firm*—Browdy and Neimark, PLLC

(57) ABSTRACT

A composite chromium plating film containing hard particles in network-shaped microcracks, a surface-occupying ratio of the microcracks being 10 to 20% by area, a distribution density of the microcracks being 1,200 to 2,500/cm, and the amount of the above hard particles being 1 to 15% by mass per 100% by mass of the above entire plating film. This composite chromium plating film has excellent wear resistance and scuffing resistance with small attacking ability to a mating member.

11 Claims, 6 Drawing Sheets

COMPOSITE CHROMIUM PLATING FILM AND SLIDING MEMBER HAVING THE SAME AND METHOD FOR MANUFACTURE THEREOF

FIELD OF THE INVENTION

The present invention relates to a composite chromium plating film containing hard particles in network-shaped microcracks, a sliding member provided with such plating film, and its production method.

BACKGROUND OF THE INVENTION

Increasingly higher demand is recently mounting for piston rings having improved scuffing resistance and wear resistance vis-à-vis cylinder liners, as higher-power, higher-fuel-efficiency internal engines are required. To satisfy such demand, piston rings are coated with chromium plating film. However, conventional chromium-plated piston rings fail to exhibit sufficient scuffing resistance and wear resistance, when used for engines subjected to high thermal load and severe wear, such as diesel engines and lead-containing gasoline engines.

Proposals were thus made to provide chromium plating films capable of retain oil for a long period of time by microcracks expanded not only on the surface but also inside. For instance, JP 10-53881 A (Reference 1) proposes a sliding member coated with a multilayer plating film having fine cavities on the surface and voids inside. The film was prepared by repeating a cycle of chromium plating and an inverse voltage treatment. If a sliding surface coated with multilayer chromium plating film is worn, voids distributed inside the film are exposed as cavities to a new surface. Accordingly, the sliding member can always maintain an appropriate amount of a lubricating oil on the sliding surface. However, the sliding member of Reference 1 is insufficient in wear resistance.

JP 62-56600 A (Reference 2) proposes a hard chromium plating layer containing solid particles in a crack network extending through the entire thickness. JP 10-130891 A (Reference 3) proposes a composite chromium plating film containing $Si_3N_4$ particles having an average diameter of 0.8 to 3 μm in a network of cracks, with a composite ratio (percentage of hard particles in the film) of 3 to 15% by volume. JP 10-130892 A (Reference 4) proposes a composite chromium plating film containing sphere particles having an average diameter of 0.7 to 10 μm in a network of cracks, with a composite ratio of 3 to 15% by volume. Because the plating films of References 2-4 contain solid particles in cracks, the cracks are prevented from being closed by sliding stress, resulting in improved wear resistance.

However, because the chromium plating films of References 2-4 are formed by using a conventional sergent bath or silicofluoride bath, they have small distribution densities of microcracks, which are expressed by the number of microcracks crossing a line of unit length. Because the plating film with a small distribution density of microcracks fails to sufficiently retain a lubricating oil on a sliding surface, it does not have good, stable sliding ability. The distribution density of microcracks can be increased to about 2,000/cm by the conventional plating method using the sergent or silicofluoride bath, as long as suitable plating conditions are selected. However, a plating film thus obtained has microcracks with inhomogeneous distribution density, and part of the plating film has low strength and wear resistance, resulting in difficulty to put such plating film in practice use.

Reference 1 JP 10-53881 A,
Reference 2 JP 62-56600 A,
Reference 3 JP 10-130891 A, and
Reference 4 JP 10-130892 A.

OBJECT OF THE INVENTION

Accordingly, an object of the present invention is to provide a composite chromium plating film having excellent wear resistance and scuffing resistance with little attacking ability to a mating member, and a sliding member coated with such plating film and its production method.

DISCLOSURE OF THE INVENTION

As a result of intensive research in view of the above object, the inventors have found:

(a) A composite chromium plating film containing hard particles in network-shaped microcracks has improved wear resistance and scuffing resistance with little attacking ability to a mating member without losing strength, when the microcracks have a surface-occupying ratio of 10 to 20% by area and a distribution density of 1,200 to 2,500/cm.

(b) When hard particles are embedded in microcracks in an amount of 1 to 15% by mass per the entire plating film, the closing of microcracks by sliding stress can be prevented, and the penetration of a lubricating oil into microcracks is enhanced, so that even if the plating film is worn by sliding, it can keep excellent wear resistance and scuffing resistance due to microcracks, with low attacking ability to a mating member.

(c) By applying an inverse voltage to a sliding member (inverse voltage treatment) in a chromium-plating bath containing at least chromium oxide, sulfuric acid, silicofluoride, a sulfonic-group-containing compound or its salt, an anionic surfactant and hard particles, it is possible to obtain a plating film having uniformly distributed microcracks at a density of 1,200/cm or more and hard particles uniformly dispersed in the microcracks.

The present invention has been completed based on such findings.

Thus, the composite chromium plating film of the present invention contains hard particles in network-shaped microcracks, the microcracks having a surface-occupying ratio of 10 to 20% by area and a distribution density of 1,200 to 2,500/cm, and the amount of the hard particles being 1 to 15% by mass per 100% by mass of the entire plating film.

The plating film preferably comprises at least two layers. The microcracks are preferably distributed substantially through the entire thickness of the plating film. The hard particles are preferably made of at least one selected from the group consisting of $Al_2O_3$, SiC, $Si_3N_4$ and diamond.

The sliding member of the present invention is coated with the above composite chromium plating film at least on a sliding surface thereof. The composite chromium plating film of the present invention is preferably formed on a sliding surface of a piston ring.

The method of the present invention for producing a sliding member comprises conducting at least one cycle comprising (a) forming a hard chromium plating film on a sliding surface of a sliding member substrate, and (b) subjecting the resultant hard chromium plating film to an inverse voltage treatment, in a state where the substrate is immersed in a chromium-plating bath containing at least chromium oxide, sulfuric acid, silicofluoride, a sulfonic-group-containing compound or its salt, an anionic surfactant and hard particles.

EFFECT OF THE INVENTION

Because network-shaped microcracks are uniformly formed on the surface of the plating film at a distribution density of 1,200 to 2,500/cm and a surface-occupying ratio of 10 to 20% by area, the composite chromium plating film of the present invention has excellent retention of a lubricating oil without anisotropy in lubricating oil reservoirs. Accordingly, it has excellent wear resistance, scuffing resistance and strength, with low attacking ability to a mating member. Because the composite chromium plating film of the present invention contains hard particles in microcracks in an amount of 1 to 15% by mass per the entire plating film, it can keep excellent wear resistance and scuffing resistance due to microcracks and low attacking ability to a mating member, even though it is worn by sliding.

Because the sliding member coated with such composite chromium plating film having such excellent properties can maintain an appropriate oil film thickness and have excellent wear resistance and scuffing resistance with low attacking ability to a mating member, it is suitable for piston rings and cylinder liners for internal engines, etc. Particularly piston rings coated with the composite chromium plating film of the present invention on their peripheries are suitable for high-power engines, high-load engines, etc.

A plating treatment and an inverse voltage treatment are conducted in a chromium-plating bath containing at least chromium oxide, sulfuric acid, silicofluoride, a sulfonic-group-containing compound or its salt, an anionic surfactant and hard particles in the present invention. According to the method of the present invention for producing a sliding member, microcracks are distributed uniformly through the resultant composite chromium plating film with their density of 1,200/cm or more, and the hard particles can be kept in the microcracks with uniform dispersion.

REFERENCE NUMERALS

Figure 1:
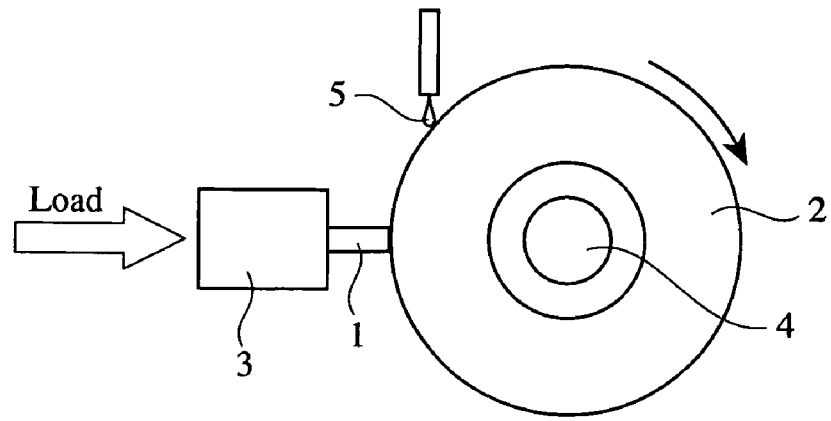
FIG. 1 is a schematic view showing a high-temperature, wet-wear tester.

1 Test piece,
2 Cylinder liner,
3 Arm,
4 Electric heater
5 Lubricant,
6 Support member,
7 Pressing member, and
70 Inlet of lubricating oil.

THE BEST MODE FOR CARRYING OUT THE INVENTION

[1] Composite Chromium Plating Film

The composite chromium plating film of the present invention (simply called "plating film" unless otherwise mentioned) comprises a hard chromium plating layer having network-shaped microcracks, whose matrix contains substantially no hard particles, and hard particles embedded in the microcracks. A lot of microcracks functioning as lubricating oil reservoirs are uniformly formed on the surface of the plating film, such that they are crossing each other to substantially have a network distribution. The microcracks preferably exist substantially through the entire thickness of the plating film. The surface-occupying ratio of the microcracks is 10 to 20% by area, preferably 10 to 15% by area. The distribution density of the microcracks on the surface of the plating film is 1,200 to 2,500/cm, preferably 1,500 to 2,000/cm. When the surface-occupying ratio of the microcracks is less than 10% by area, or when the distribution density of the microcracks is less than 1,200/cm, the microcracks do not sufficiently function as lubricating oil reservoirs, resulting in the plating film with insufficient oil retention and thus poor sliding properties. On the other hand, when the surface-occupying ratio of the microcracks is more than 20% by area, or when the distribution density of the microcracks is more than 2,500/cm, the plating film is brittle and thus has poor strength.

Even though the surface-occupying ratio of the microcracks is within a range of 10 to 20% by area, the microcracks would not be distributed uniformly if the distribution density of the microcracks were less than 1,200/cm. That causes abnormal wear particularly in portions having a low distribution density of microcracks. This lowers the wear resistance of the entire plating film.

The surface-occupying ratio of the microcracks was determined by the image analysis of a scanning-electron photomicrograph of the plating film surface. Specifically, the scanning-electron photomicrograph of the plating film surface was taken in a real-time image analyzer, Luzex F available from Nireco Corporation, and image-treated by an image-treating software, Luzex F Standard System Ver. 3.30. The total area of portions having no microcracks was subtracted from the surface area (128 μm×16 μm) of the plating film in the photomicrograph to determine the area of the microcracks. An area percentage of the microcracks was determined, assuming that the surface of the above plating film (128 m×16 μm) was 100% by area. If necessary, the plating film surface may be slightly dissolved by chromic acid before taking photograph.

The distribution density (/cm) of the microcracks in the plating film was determined by drawing 5 to 10 arbitrary 10-cm-long straight lines on a photomicrograph (magnification: 10×10) of the plating film surface, counting the numbers of intersections of the lines and the microcracks, and averaging them. If necessary, the plating film surface may be slightly dissolved by chromic acid before taking photograph. When the plating film is formed on a piston ring, the surface-occupying ratio and distribution density of the microcracks are measured on the plating film surface near a portion opposed to a joint.

Hard particles embedded in microcracks of the plating film prevent the closing of the microcracks by sliding stress, and promote the penetration of a lubricating oil into the microcracks. Accordingly, even though the plating film is worn by sliding, the plating film can keep excellent wear resistance and scuffing resistance and low attacking ability to a mating member by the microcracks. The amount of the hard particles (composite ratio) in the plating film is 1 to 15% by mass, preferably 3 to 12% by mass, per 100% by mass of the entire plating film. When the composite ratio is 1 to 15% by mass, the hard particles are stably retained in the microcracks. This allows drastically improved wear resistance and scuffing resistance of the plating film. When the composite ratio is less than 1% by mass, the plating film has poor wear resistance and scuffing resistance. On the other hand, when it is more than 15% by mass, hard particles cannot easily be retained stably in the microcracks, resulting in large attacking ability to the mating member. The composite ratio was determined by quantitatively analyzing the plating film surface by an X-ray fluorescence analyzer, and calculating a percentage (% by mass) of the hard particles from the quantitatively measured ratio of each element.

The hard particles are preferably made of at least one selected from the group consisting of $Al_2O_3$, SiC, $Si_3N_4$ and diamond, more preferably made of SiC and/or $Si_3N_4$, particularly preferably $Si_3N_4$. The average diameter of the hard particles is preferably 0.3 to 5 μm, more preferably 0.3 to 2 μm, most preferably 0.3 to 1.5 μm. When the hard particles have an average diameter of more than 5 μm, there may be large attacking ability to the mating member.

The plating film is preferably as thick as 10 to 200 μm. If the plating film were as thin as less than 10 μm, the plating film formed on a sliding member such as a piston ring, etc. might have insufficient durability. On the other hand, even if the plating film were made as thick as more than 200 μm, further effects would not be obtained, unpreferable in terms of production cost and time.

When such plating film is worn by sliding, microcracks distributed inside the plating film are newly exposed. Because microcracks exist substantially through the entire thickness of the plating film of the present invention, the surface-occupying ratio and distribution density of microcracks are substantially within the above ranges on a surface newly exposed by wearing. Accordingly, even if wearing proceeds, the plating film of the present invention can always retain an appropriate amount of a lubricating oil on a sliding surface, thereby maintaining excellent scuffing resistance and wear resistance.

[2] Production Method of Composite Chromium Plating Film

The composite chromium plating film of the present invention is produced by immersing a member to be plated (for instance, a substrate of a sliding member such as a piston ring, etc.) in a chromium-plating bath containing at least chromium oxide ($CrO_3$), sulfuric acid ($H_2SO_4$), silicofluoride, a sulfonic-group-containing compound or its salt, an anionic surfactant and hard particles, and conducting the steps of (a) forming a hard chromium plating layer on a sliding surface of the substrate, and (b) subjecting the resultant hard chromium plating layer to an inverse voltage treatment, and if necessary, repeating the above steps (a) and (b).

(1) Composition of Plating Bath

The concentrations of chromium oxide ($CrO_3$) and sulfuric acid may be in ranges in a usual sergent bath. For instance, the concentration of $CrO_3$ is preferably 200 to 400 g/L, $CrO_3/H_2SO_4$ being 100/0.2 to 100/1.2 (mass ratio).

The amount of the hard particles in the chromium-plating bath is preferably 10 to 200 g/L, so that the composite ratio can be 1 to 15% by mass, with a uniform distribution of the hard particles in the microcracks. Because there is little difference in a density between SiC and $Si_3N_4$ particles and the plating bath composition, SiC and $Si_3N_4$ particles are well dispersed in the plating bath. Accordingly, SiC and $Si_3N_4$ particles are easily and uniformly embedded in the microcracks, which are expanded by the inverse voltage treatment.

The silicofluoride improves the adhesion between layers of the multilayer chromium plating film. The concentration of the silicofluoride in the plating bath is preferably 3 to 8 g/L. When this concentration is less than 3 g/L, the multiplayer plating film might have insufficient adhesion between layers. On the other hand, when it is more than 8 g/L, the member to be plated is likely to be corroded. The silicofluoride may be, for instance, hydrosilicofluoric acid ($H_2SiF_6$), potassium silicofluoride-silicofluoride, sodium silicofluoride silicofluoride, etc.

The sulfonic-group-containing compound or its salt functions to increase the density of microcracks in the plating film. The concentration of the sulfonic-group-containing compound or its salt is preferably 0.02 to 0.1 mol/L, more preferably 0.04 to 0.07 mol/L, and particularly preferably 0.045 to 0.06 mol/L, on a sulfonic group basis. When this concentration is less than 0.02 mol/L, the density of microcracks is not likely to reach 1,200 to 2,500/cm. On the other hand, when it is more than 0.1 mol/L, the resultant plating film tends to be brittle. The sulfonic-group-containing compounds or their salts are preferably sulfonic acids, disulfonic acids and their salts. Specific examples of sulfonic acids and disulfonic acids are aliphatic sulfonic acids (for instance, methane sulfonic acid, ethane sulfonic acid, etc.), aliphatic disulfonic acids (for instance, methane disulfonic acid, ethane disulfonic acid, etc.), aromatic sulfonic acids (for instance, benzene sulfonic acid, p-toluene sulfonic acid, etc.), aromatic disulfonic acids (for instance, benzene disulfonic acid, etc.), etc.

The anionic surfactant functions to decrease the surface tension of the plating bath, and charge the hard particles negative, thereby making it easy for the hard particles to be embedded in the microcracks, such that they are uniformly dispersed in the microcracks. The surface tension of the plating bath is preferably 10 to 70 dyne/cm. To achieve such a surface tension, the amount of the anionic surfactant is preferably 100 to 1,000 ppm by mass.

Preferable anionic surfactants are fluorine-containing anionic surfactants stable in the chromium-plating bath. The fluorine-containing anionic surfactants may be compounds or salts thereof having one or more hydrocarbon groups at least partially substituted by fluorine and one or more acidic groups. Their examples are compounds represented by:

The following formula (1):

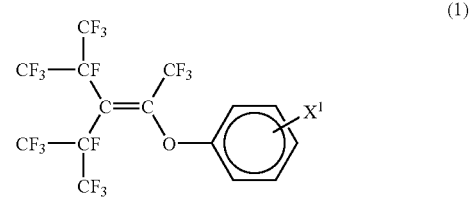

wherein $X^1$ represents a sulfonic group, a phosphoric group, a phosphonic group, a carboxylic group, a sulfonate group, a phosphate group, a phosphonate group or a carboxylate group;

The following formula (2):

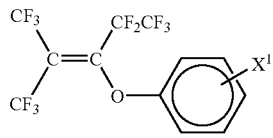

(2)

wherein $X^1$ is the same as in the formula (1);
The following formula (3), which is disclosed by JP 7-60096 A:

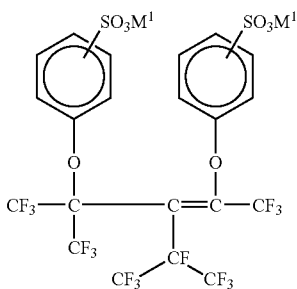

(3)

wherein $M^1$ represents an alkali metal;
The following formula (4), which is disclosed by JP 2003-210967 A:

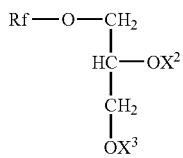

(4)

wherein $X^2$ and $X^3$ independently represent a hydrogen atom or —$SO_3M^2$, wherein $M^2$ represents a hydrogen atom or an alkali metal atom, at least one of $X^2$ and $X^3$ being —$SO_3M^2$, and Rf represents a perfluorohexenyl group or a perfluorononenyl group; and
The following formula (5), which is disclosed by JP 2003-286246 A:

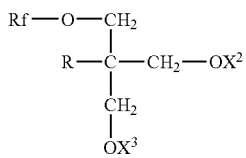

(5)

wherein $X^2$, $X^3$ and Rf are the same as in the formula (4), and R represents a saturated alkyl group having 1 or 2 carbon atoms, etc.

The fluorine-containing anionic surfactants are commercially available, which may be, for instance, Ftergent 100, 100C, 110, 140A, 150, 150CH, A-K and 501 available from Neos Co. Ltd., FC-95 available from Sumitomo 3M Limited, etc.

(2) Plating Step and Inverse Voltage Treatment Step

A member to be plated (substrate) is immersed in the above chromium-plating bath, with the substrate as an anode and a counter electrode as a cathode, and an electric current of 20 to 80 A/dm$^2$ is supplied for 10 to 120 seconds at a plating bath temperature of 40 to 60° C. to conduct a pretreatment (electrolytic polishing). With the polarities of the substrate and the counter electrode rapidly reversed, an electric current of 30 to 80 A/dm$^2$ is supplied for 10 to 60 minutes at plating bath temperature of 40 to 60° C. to deposit a hard chromium plating layer. With the polarities of the substrate and the counter electrode rapidly reversed again, an electric current of 5 to 60 A/dm$^2$ is supplied for 60 to 200 seconds at a plating bath temperature of 50 to 60° C. to conduct the inverse voltage treatment.

When the current density in the inverse voltage treatment is less than 5 A/dm$^2$, when the plating bath temperature is lower than 50° C. during the inverse voltage treatment, or when the inverse voltage treatment time is shorter than 60 seconds, microcracks are not likely to be formed sufficiently. On the other hand, when the current density in the inverse voltage treatment is more than 60 A/dm$^2$, when the plating bath temperature is higher than 60° C. during the inverse voltage treatment, or when the inverse voltage treatment time is longer than 200 seconds, the distribution of microcracks is not likely to be uniform. The current density in the inverse voltage treatment is preferably 15 to 25 A/dm$^2$.

The plating film having at least two layers is preferably formed by repeating the above plating step and inverse voltage treatment. The thickness of the plating film can be controlled by the number of layers. The thickness of the composite chromium plating film, the surface-occupying ratio and distribution density of the microcracks, and the composite ratio can be controlled by properly adjusting the bath composition, the current density, the plating bath temperature, the current-supplying time, etc. in the chromium plating step and the inverse voltage treatment step. To control each of the above properties, it is particularly effective to adjust the concentration of the sulfonic-group-containing compound or its salt, and/or the inverse voltage treatment conditions.

By adopting the above coating method, the plating film having network-shaped microcracks substantially distributed through the entire thickness can be obtained. The hard particles charged negative by the above anionic surfactant are attracted to the substrate on the anode side during the inverse voltage treatment. Because the plating liquid is highly penetrable into the plating film due to surface tension lowered by the anionic surfactant, the hard particles easily enter into the microcracks expanded by the inverse voltage treatment, so that they are uniformly dispersed. In the case of forming the multiplayer plating film, a new plating layer is formed on already formed plating layers containing hard particles, so that the hard particles are stably held in the microcracks.

The present invention will be described in further detail referring to Examples below without intention of restricting it thereto.

REFERENCE EXAMPLE 1

(1) Production of Test Piece
$CrO_3$: 250 g/L,
$H_2SO_4$: 1.2 g/L,
$H_2SiF_6$: 3.5 g/L,
Methane sulfonic acid: 5 g/L,
$Si_3N_4$ particles (average diameter: 0.7 μm): 100 g/L, and
Anionic surfactant [tradename "Ftergent 110" (fluorosulfate surfactant, available from Neos Co., Ltd.)]: 500 ppm by mass.

A square-cross-sectioned rod (5 mm×5 mm×20 mm) made of carbon tool steel (SK-5) was lapped to a surface roughness (Rz: 10-point-averaged roughness) of 1 µm or less, and immersed in acetone for degreasing. This square-cross-sectioned rod was immersed in a plating bath having the above composition, to conduct a pretreatment by supplying an electric current of 60 A/dm$^2$ for 15 seconds at a plating bath temperature of 55° C. with the square-cross-sectioned rod as an anode, and a counter electrode as a cathode. With the polarities of the square-cross-sectioned rod and the counter electrode reversed, an electric current of 60 A/dm$^2$ was supplied for 30 minutes at a plating bath temperature of 55° C. to form a hard chromium plating layer. With the polarities of the square-cross-sectioned rod and the counter electrode reversed again, an electric current was supplied for 2 minutes and 30 seconds at a plating bath temperature of 55° C. to conduct an inverse voltage treatment, to form a composite chromium plating film. At this time, a current density in the inverse voltage treatment was changed within a range of 5 to 30 A/dm$^2$, to produce pluralities of test pieces having different surface-occupying ratios of microcracks. With respect to each test piece, a cycle of the above plating step and the inverse voltage treatment step was repeated 12 times in total, to form a 120-µm-thick composite chromium plating film.

(2) Production of Reference Test Pieces

Reference test pieces were produced in the same manner as above except for adding no methane sulfonic acid to the plating bath, and changing the amount of the anionic surfactant to 10 ppm by mass. The current density in the inverse voltage treatment was 20 A/dm$^2$.

(3) Wear Resistance Test

Figure 2:
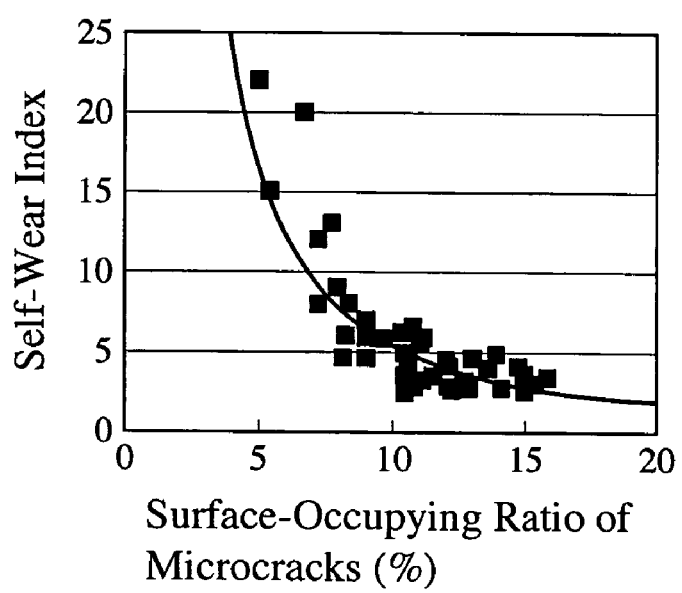
FIG. 2 is a graph showing the relation between a surface-occupying ratio of microcracks and a self-wear index in test pieces of Reference Example 1.

Each of the resultant test pieces and reference test pieces was evaluated with respect to wear resistance by the following high-temperature, wet-wear test. The high-temperature, wet-wear test was carried out by a Riken-type, high-temperature, wet-wear tester shown in FIG. 1 using a drum cylinder liner of cast iron (FC250) as a mating member. This tester comprises a rotatable drum cylinder liner 2, an arm 3 for pressing a test piece 1 onto a periphery of the cylinder liner 2, and an electric heater 4 for heating the cylinder liner 2. With the drum cylinder liner 2 heated to 180° C. by the electric heater 4, the test was conducted at a sliding speed of 0.5 m/second and a pressing load of 490 N for 4 hours while dropping a motor oil [#30, available from White Power (WP)] as a lubricant 5 at a speed of 0.15 ml/minute, to examine the wear of each test piece and reference test piece, and the wear of a mating member (cylinder liner 2) by each test piece and reference test piece. The wear resistance was evaluated according to a self-wear index with the wear of the reference test piece as 100. The relations between the surface-occupying ratio of the microcracks and the self-wear index in the test pieces are shown in FIG. 2. As is clear from FIG. 2, when the surface-occupying ratio of the microcracks is increased to 10% or more by area, the self-wear index becomes small. It is thus clear that excellent oil retention can be obtained when the surface-occupying ratio of the microcracks is 10% or more by area. However, when the surface-occupying ratio of the microcracks exceeds 20% by area, the plating film tends to become brittle. Accordingly, the surface-occupying ratio of the microcracks is determined as 20% or less by area in the plating film of the present invention.

REFERENCE EXAMPLE 2

Figure 3:
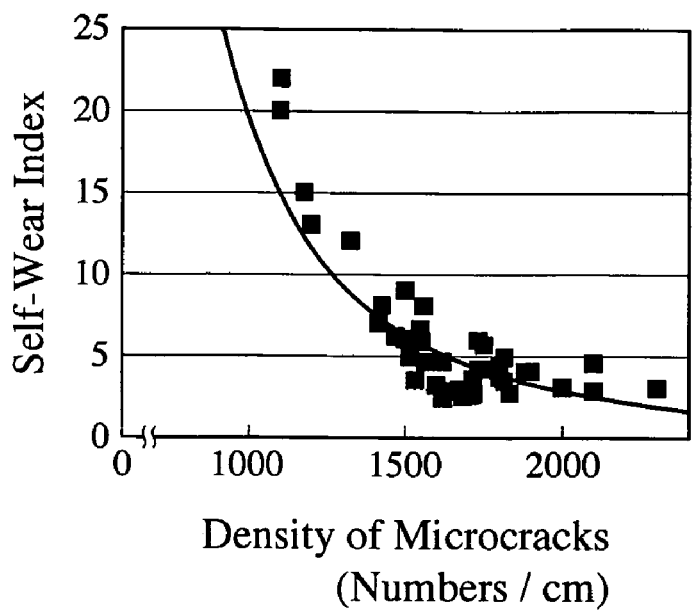
FIG. 3 is a graph showing the relation between the density of microcracks and a self-wear index in test pieces of Reference Example 2.

Pluralities of test pieces having different microcrack densities were produced in the same manner as in Reference Example 1, except for changing the concentration of methane sulfonic acid in the plating bath within a range of 0.5 to 10 g/L, and changing a current density in the inverse voltage treatment within a range of 5 to 30 A/dm$^2$. The wear resistance of each of the resultant test pieces was evaluated by the above high-temperature, wet-wear test. The relations between the density of microcracks and the self-wear index in the test pieces are shown in FIG. 3. As is clear from FIG. 3, when the density of microcracks was increased to 1,200/cm or more, the self-wear index remarkably decreased. It is thus clear that when the surface-occupying ratio of the microcracks is 1,200/cm or more, excellent oil retention can be obtained. When the surface-occupying ratio of the microcracks becomes 1,500/cm or more, the self-wear index becomes substantially constant. However, the plating film tends to become brittle at more than 2,500/cm. Accordingly, the distribution density of the microcracks was determined as 2,500/cm or less in the plating film of the present invention.

REFERENCE EXAMPLE 3

Figure 4:
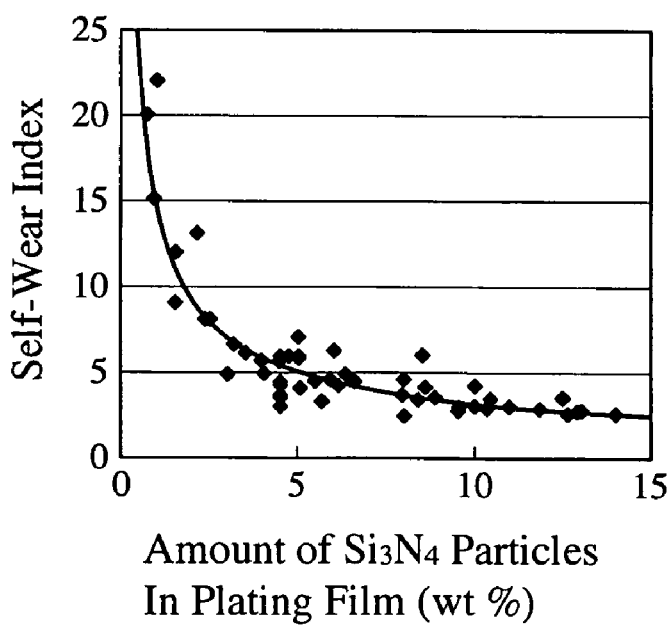
FIG. 4 is a graph showing the relation between a composite ratio and a self-wear index in test pieces of Reference Example 3.

Pluralities of test pieces containing different amounts of $Si_3N_4$ particles (composite ratios) were produced in the same manner as in Reference Example 1, except for changing the concentration of an anionic surfactant in the plating bath within a range of 50 to 1,000 ppm by mass, and the concentration of $Si_3N_4$ particles in the plating bath within a range of 50 to 100 g/L, at a constant current density of 20 A/dm$^2$ in the inverse voltage treatment. The wear resistance of the resultant test pieces was evaluated by the above high-temperature, wet-wear test. The relations between the amounts of $Si_3N_4$ particles (composite ratios) and the self-wear indexes in the test pieces are shown in FIG. 4. As is clear from FIG. 4, when the composite ratio was 1% or more by mass, the self-wear index remarkably decreased.

REFERENCE EXAMPLE 4

Figure 5:
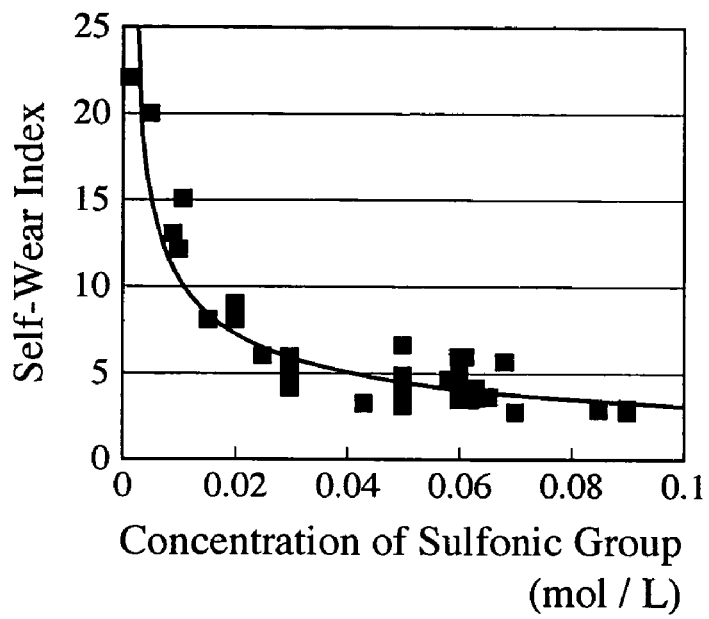
FIG. 5 is a graph showing the relation between the concentration of sulfonic group in the production of test pieces of Reference Example 4 and a self-wear index.

Pluralities of test pieces were produced in the same manner as in Reference Example 1, except for changing the concentration of methane sulfonic acid (concentration of sulfonic group) in the plating bath within a range of 0.001 to 0.09 mol/L (0.1 to 9 g/L), at a constant current density of 20 A/dm$^2$ in the inverse voltage treatment. The wear resistance of the resultant test pieces was evaluated by the above high-temperature, wet-wear test. The relations between the concentration of sulfonic groups at the time of producing the test pieces and self-wear indexes are shown in FIG. 5. As is clear from FIG. 5, when the concentration of sulfonic groups was 0.02 mol/L or more, the self-wear index remarkably decreased. It is thus presumed that the addition of the sulfonic-group-containing compound in an amount of 0.02 mol/L or more on a sulfonic group basis forms microcracks uniformly on the surface of the plating film, resulting in high effect of retaining a lubricating oil.

REFERENCE EXAMPLE 5

Pluralities of test pieces were produced in the same manner as in Reference Example 1, except for changing the concentration of an anionic surfactant in the plating bath within a range of 20 to 940 ppm by mass, at a constant current density of 20 A/dm$^2$ in the inverse voltage treatment.

Figure 6:
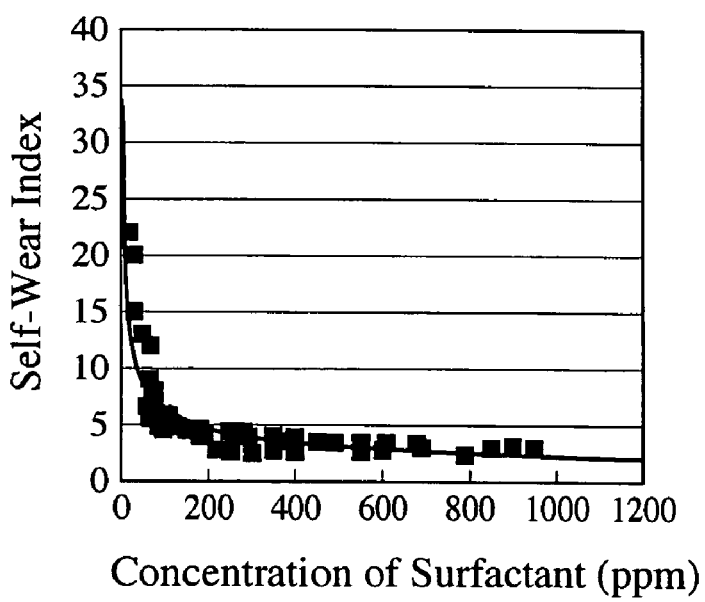
FIG. 6 is a graph showing the relation between the concentration of an anionic surfactant in the production of test pieces of Reference Example 5 and a self-wear index.

The wear resistance of the resultant test pieces was evaluated by the above high-temperature, wet-wear test. The relations between the concentration of an anionic surfactant at the time of producing the test pieces and self-wear indexes are shown in FIG. 6. As is clear from FIG. 6, when the concentration of an anionic surfactant is 100 ppm or more, the self-wear index remarkably decreased. It is thus presumed that the addition of the anionic surfactant in an amount of 100 ppm or more enables the hard particles to effectively enter into the microcracks, so that the hard particles in the microcracks prevent the microcracks from being closed by sliding stress, and promote the intrusion of the lubricating oil into the microcracks. As a result, the plating film can keep excellent wear resistance by the microcracks.

EXAMPLES 1 TO 4

Square-cross-sectioned rods (5 mm×5 mm×20 mm) made of carbon tool steel (SK-5) were lapped and then degreased in the same manner as in Reference Example 1. These square-cross-sectioned rods were subjected to a pretreatment, chromium plating and an inverse voltage treatment in the same manner as in Reference Example 1, except that they were immersed in composite plating baths having compositions shown in Table 1, and that a current density in the inverse voltage treatment was constant at 20 A/dm$^2$. A cycle consisting of a plating step and an inverse voltage treatment step was repeated 12 times in total, to form 120-μm-thick composite chromium plating films. The surface-occupying ratio, distribution density of the microcracks and composite ratio of the hard particles in the resultant test pieces are shown in Table 2.

COMPARATIVE EXAMPLES 1 TO 10

Square-prism-shaped test pieces with composite chromium plating films were produced in the same manner as in Example 2 except for changing the composition of the composite plating bath and the current density at the inverse voltage treatment as shown in Table 1. The surface-occupying ratios and the distribution densities of the microcracks and the composite ratios of the hard particles in the resultant test pieces are shown in Table 2.

(1) Wear Resistance Test (a) High-Temperature, Wet-Wear Test

Figure 7:
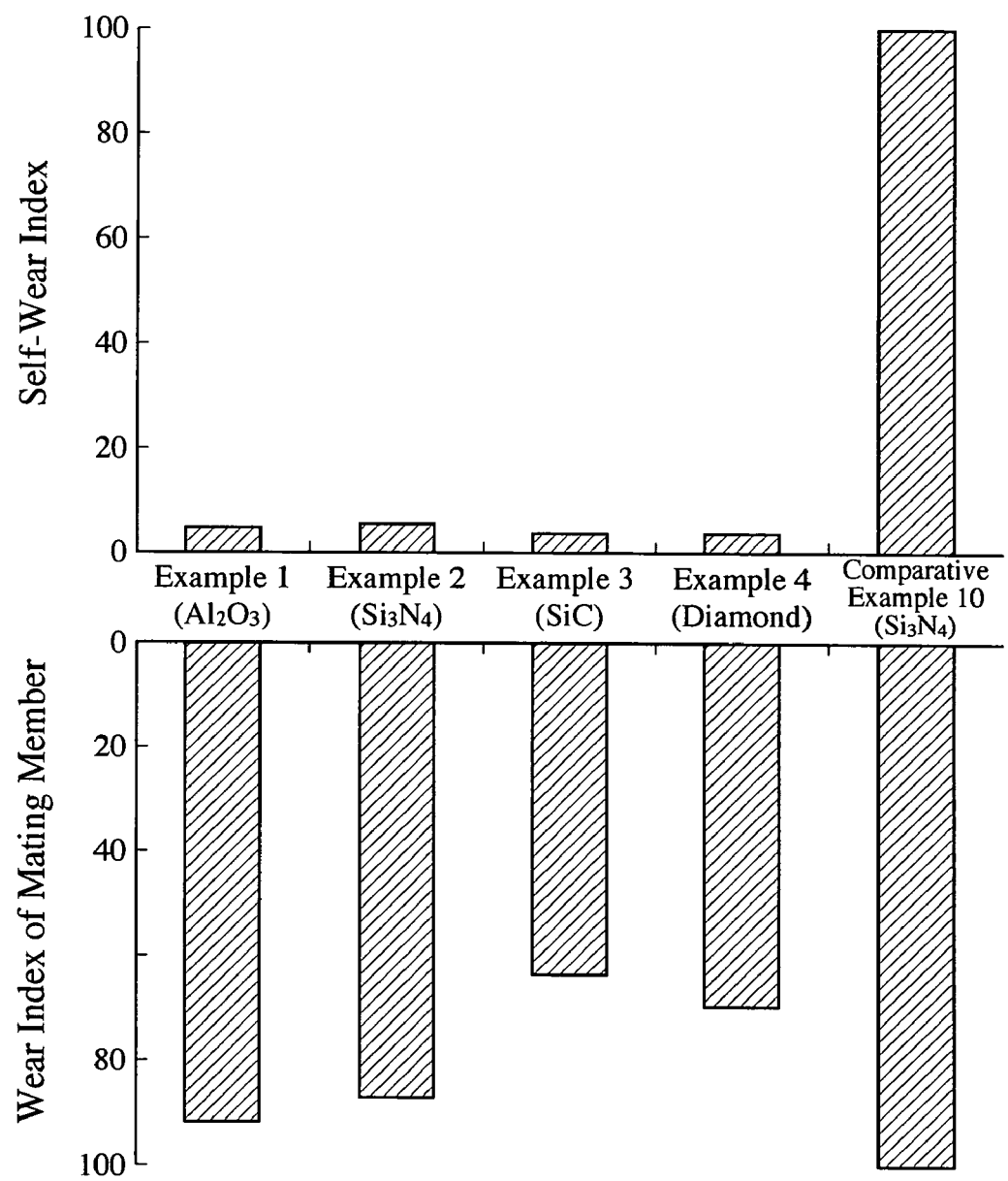
FIG. 7 is a graph showing a self-wear index and a wear index of a mating member in the high-temperature, wet-wear test of test pieces of Examples 1 to 4 and Comparative Example 10.

The wear resistance of test pieces obtained in Examples 1 to 4 and Comparative Examples 1 to 10 was measured by the above high-temperature, wet-wear test. The wear resistance was evaluated according to the self-wear index with the wear of the test piece of Comparative Example 10 as 100. The attacking ability to a mating member was evaluated according to a wear index of a mating member with the wear of the mating member in Comparative Example 10 as 100. The results are shown in Table 2 and FIG. 7.

(b) High-Temperature, Dry-Wear Test

Figure 8:
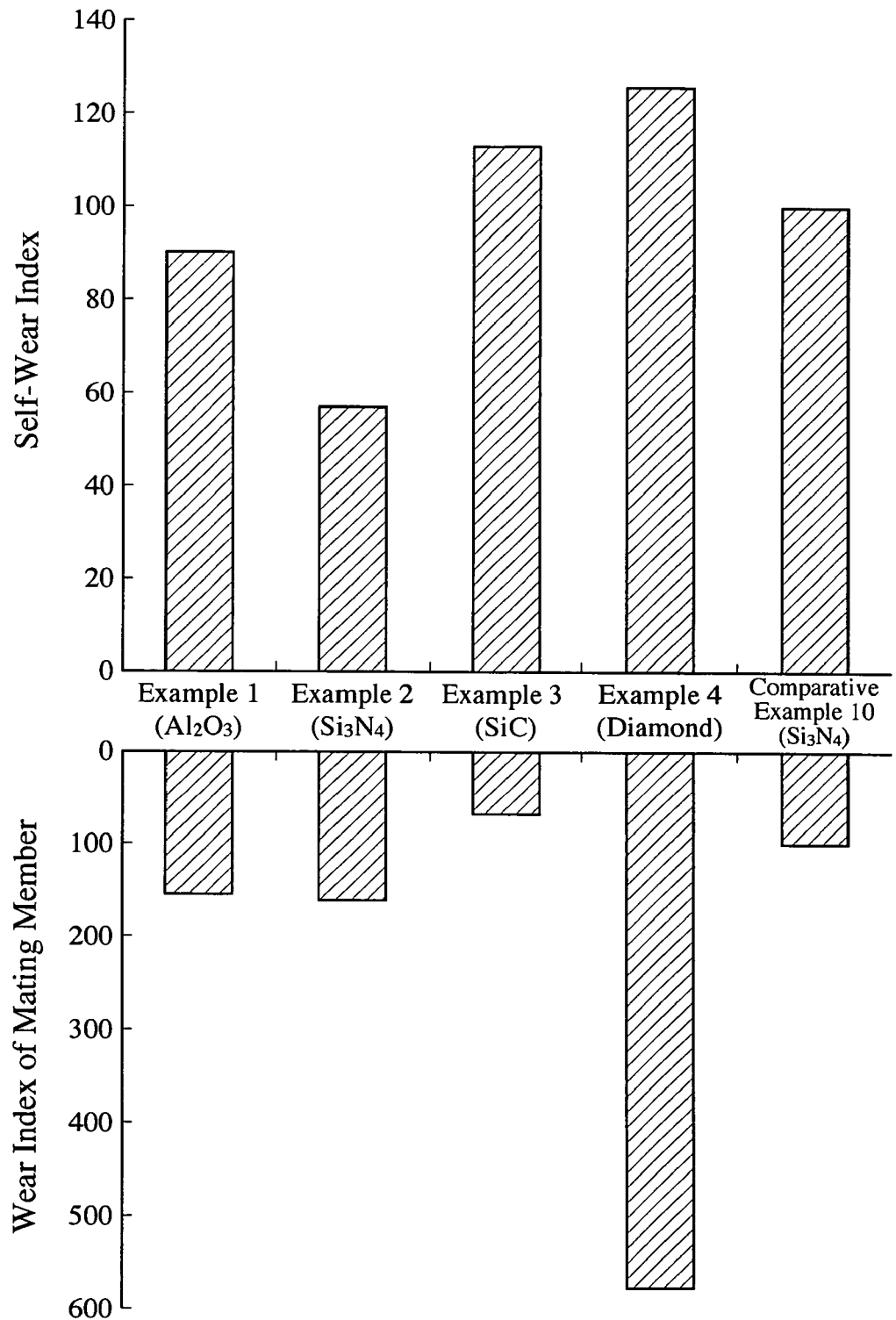
FIG. 8 is a graph showing a self-wear index and a wear index of a mating member in the high-temperature, dry-wear test of test pieces of Examples 1 to 4 and Comparative Example 10.

A wear test was conducted in a high-temperature, dry state in the same manner as in the above high-temperature, wet-wear test except for omitting the dropping of a lubricant 5. The wear resistance was evaluated according to the self-wear index with the wear of the test piece of Comparative Example 10 as 100. The attacking ability to a mating member was evaluated according to the wear index of a mating member with the wear of the mating member (cylinder liner 2) in Comparative Example 10 as 100. The results are shown in Table 2 and FIG. 8.

(2) Scuffing Resistance Test

Figure 9:
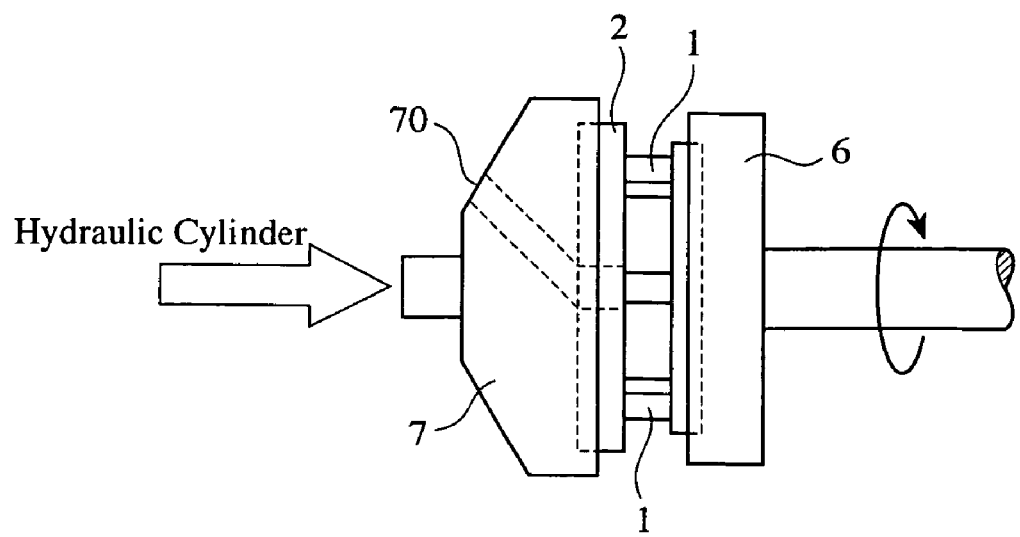
FIG. 9 is a schematic view showing a scuffing tester.

The scuffing resistance of test pieces in Examples 1 to 4 and Comparative Examples 1 to 10 was measured. A Riken-type, scuffing tester shown in FIG. 9 was used for a scuffing resistance test. This tester comprises (i) a rotatable member 6 for supporting a test piece 1, (ii) a cylinder liner 2, and (iii) a member 7 with a lubricant inlet 70 for pressing the cylinder liner 2 onto the test piece 1. A test comprising increasing a pressing pressure stepwise by 1 MPa from 2 MPa at a sliding speed of 8 m/second until scuffing occurred, while supplying a motor oil [#30, available from White Power (WP)] as a lubricant at a speed of 400 ml/minute, and keeping each pressure for 3 minutes was conducted to measure the scuffing start pressure of each test piece. The scuffing resistance was evaluated according to a scuffing index with the scuffing start pressure of the test piece of Comparative Example 10 as 100. The results are shown in Table 2.

TABLE 1

| No. | $CrO_3$ (g/L) | $H_2SO_4$ (g/L) | $H_2SiF_6$ (g/L) | Methane Sulfonic Acid (g/L) | Hard Particles[1] (100 g/L) | Anionic Surfactant[2] (ppm) | Surface Tension (dyne/cm) | Current Density (A/dm$^2$) |
|---|---|---|---|---|---|---|---|---|
| Example 1 | 250 | 1.2 | 3.5 | 5 | $Al_2O_3$ | 500 | 30 | 20 |
| Example 2 | 250 | 1.2 | 3.5 | 5 | $Si_3N_4$ | 500 | 33 | 20 |
| Example 3 | 250 | 1.2 | 3.5 | 5 | SiC | 500 | 31 | 20 |
| Example 4 | 250 | 1.2 | 3.5 | 5 | Diamond | 500 | 29 | 20 |
| Com. Ex. 1 | 250 | 1.2 | 3.5 | 0.5 | $Si_3N_4$ | 500 | 30 | 20 |
| Com. Ex. 2 | 250 | 1.2 | 3.5 | 2 | $Si_3N_4$ | 500 | 32 | 20 |
| Com. Ex. 3 | 250 | 1.2 | 3.5 | 8 | $Si_3N_4$ | 500 | 30 | 20 |
| Com. Ex. 4 | 250 | 1.2 | 3.5 | 5 | $Si_3N_4$ | 500 | 31 | 10 |
| Com. Ex. 5 | 250 | 1.2 | 3.5 | 5 | $Si_3N_4$ | 500 | 31 | 30 |
| Com. Ex. 6 | 250 | 1.2 | 3.5 | 3 | $Si_3N_4$ | 500 | 31 | 5 |
| Com. Ex. 7 | 250 | 1.2 | 3.5 | 3 | $Si_3N_4$ | 500 | 30 | 10 |
| Com. Ex. 8 | 250 | 1.2 | 3.5 | 3 | $Si_3N_4$ | 500 | 31 | 25 |
| Com. Ex. 9 | 250 | 1.2 | 3.5 | 3 | $Si_3N_4$ | 500 | 31 | 30 |
| Com. Ex. 10 | 250 | 1.2 | 3.5 | No | $Si_3N_4$ | 10 | 69 | 20 |

Note:
[1] Average diameter: 0.7 μm, concentration: 100 g/L.
[2] Tradename "Ftergent 110" (fluorosulfate surfactant, available from Neos Co. Ltd.).

TABLE 2

| No. | Density of Microcracks (/cm) | Composite Ratio (wt. %) | Surface-Occupying Ratio of Microcracks (% by area) | High-Temperature Wet-Wear Test | | High-Temperature, Dry-Wear Test | | Scuffing Resistance Index |
|---|---|---|---|---|---|---|---|---|
| | | | | Self-Wear Index | Wear Index of Mating Member | Self-Wear Index | Wear Index of Mating Member | |
| Example 1 | 1,896 | 10.68 | 13.93 | 4.8 | 91.8 | 90.2 | 155.3 | 174 |
| Example 2 | 1,789 | 10.59 | 12.73 | 5.4 | 87.0 | 57.1 | 161.7 | 176 |
| Example 3 | 1,963 | 9.68 | 11.25 | 3.8 | 63.6 | 112.9 | 68.1 | 173 |
| Example 4 | 2,006 | 10.99 | 13.59 | 3.8 | 69.7 | 125.8 | 576.5 | 180 |
| Com. Ex. 1 | 950 | 1.61 | 7.28 | 92.9 | 101 | — | — | 109 |
| Com. Ex. 2 | 1,081 | 2.52 | 8.68 | 84.1 | 95.1 | — | — | 112 |
| Com. Ex. 3 | 2,700 | 15.39 | 14.36 | 30.5 | 103.8 | — | — | 152 |
| Com. Ex. 4 | 1,869 | 5.10 | 5.15 | 30.2 | 79.2 | — | — | 112 |
| Com. Ex. 5 | 1,920 | 18.10 | 23.42 | 30.4 | 109.1 | — | — | 148 |
| Com. Ex. 6 | 1,653 | 5.69 | 3.10 | 24.4 | 71.3 | — | — | 120 |
| Com. Ex. 7 | 1,425 | 6.49 | 5.32 | 23.0 | 79.8 | — | — | 123 |
| Com. Ex. 8 | 1,522 | 18.43 | 12.37 | 21.7 | 98.3 | — | — | 149 |
| Com. Ex. 9 | 1,691 | 18.70 | 24.23 | 25.8 | 106.1 | — | — | 153 |
| Com. Ex. 10 | 368 | 1.94 | 2.80 | 100 | 100 | 100 | 100 | 100 |

As is clear from Table 2, Examples 1 to 4 exhibited smaller self-wear indexes and larger scuffing resistance indexes in the high-temperature, wet-wear test than Comparative Examples 1 to 10. With respect to the wear indexes of a mating member in the high-temperature, wet-wear test, Examples 1 to 4 are smaller than Comparative Examples 1 to 10. The composite chromium plating films of Examples 1 to 4, which had microcracks with a surface-occupying ratio of 10 to 20% by area and a distribution density of 1,200 to 2,500/cm, and hard particles with a composite ratio of 1 to 15% by mass, showed excellent wear resistance and scuffing resistance with little attacking ability to a mating member. Particularly the composite chromium plating film of Example 2 comprising $Si_3N_4$ particles has a small self-wear index in the high-temperature, dry-wear test, too. Accordingly, even when a lubricating oil lacks, the plating film comprising $Si_3N_4$ particles has little wear resistance.

What is claimed is:

1. A composite chromium plating film containing hard particles in network-shaped microcracks, said microcracks having a surface-occupying ratio of 10 to 20% by area and a distribution density of 1,200 to 2,500/cm, and the amount of said hard particles being 1 to 15% by mass per 100% by mass of the entire plating film.

2. The composite chromium plating film according to claim 1, wherein said plating film comprises at least two layers.

3. A sliding member having the composite chromium plating film recited in claim 1 formed on at least a sliding surface of a sliding member substrate.

4. A sliding member having the composite chromium plating film recited in claim 2 formed on at least a sliding surface of a sliding member substrate.

5. The composite chromium plating film according to claim 1 wherein said hard particles comprise at least one of $Al_2O_3$, SiC, $Si_3N_4$ and diamond.

6. The sliding member of claim 3 on a piston ring or a cylinder liner for an internal combustion engine.

7. The composite chromium plating film of claim 1 wherein the surface-occupying ratio of the microcracks is 10 to 15% by area and the distribution density of the microcracks on the surface of the plating film is 1500 to 2000/cm.

8. The plating film of claim 5 wherein the average diameter of the hard particles is 0.3 to 5 μm.

9. The plating film of claim 5 wherein the average diameter of the hard particles is 0.3 to 2 μm.

10. The plating film of claim 5 wherein the average diameter of the hard particles is 0.3 to 1.5 μm.

11. The plating film of claim 1 having a thickness of 10 to 200 μm.

* * * * *